T. IUCHI.
SPIN SCALE.
APPLICATION FILED MAR. 14, 1917.

1,256,566.

Patented Feb. 19, 1918.

Inventor:
Tahee Iuchi,
By: B. Singer
Atty.

UNITED STATES PATENT OFFICE.

TAHEI IUCHI, OF TOKUSHIMA, JAPAN.

SPIN-SCALE.

1,256,566.     Specification of Letters Patent.     Patented Feb. 19, 1918.

Application filed March 14, 1917. Serial No. 154,753.

*To all whom it may concern:*

Be it known that I, TAHEI IUCHI, a subject of the Emperor of Japan, residing at No. 13 Nishi-Shinmachi, city of Tokushima, Empire of Japan, have invented Improvements in Spin-Scales, of which the following is a specification.

My invention has reference to certain improvements in weighing machines, and has particular reference to that class of weighing machines in which beam and other connecting parts are rotatable which are best known as spin scales, wherein a hollow cylindrical member suspended from the fulcrum end of the graduated beam has an internally disposed flange member adapted to rest upon and smoothly registering with the upper surface of the closer member forming the bottom of a bulb, the said flange member being carried by the rod communicating with the object-receiving part of the scale affords the means to run every rotatable part in a permanent smooth manner without liability to affect the knife-edge of the fulcrum of the beam.

Further object of this invention is to prevent the access of grit and dust to that part of the rod connecting with the bulb, as the point of junction is made within the hollow space of the said bulb.

These objects I attain in the following manner, reference being had to the accompanying drawings, in which:—

Figure 1:
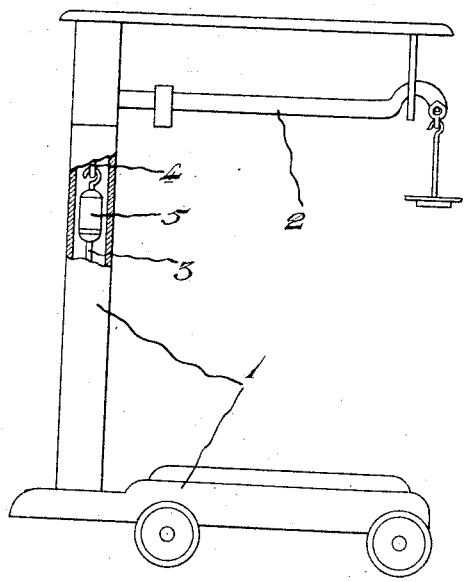
Figure 1 is a side elevation, partly broken, illustrating my invention.
Figure 2:
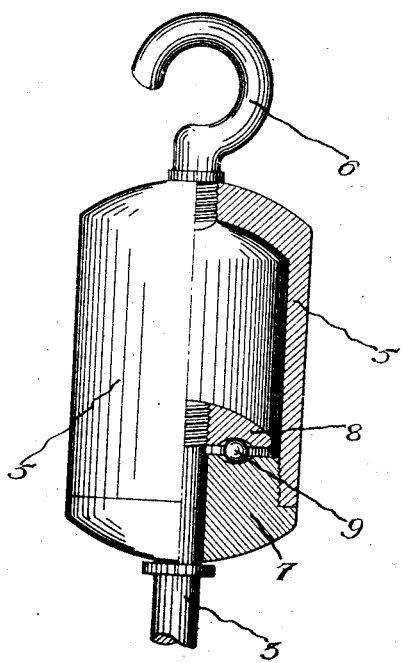
Fig. 2 is a side elevation of the bulb shown on a large scale and half sectioned to show the interior.

My invention contemplates the use of hollow cylindrical bulb member 5, dependingly disposed between the upper and lower rods 4 and 3, respectively, with which are connected all the upper rotatable parts, including bulb itself, and lower stationary parts of the scale, 1, respectively, as shown in Fig. 1.

Screwed or otherwise secured to the upper middle point of the said bulb 5 is a suitable hook 6, adapted to engage corresponding lower hooked end of the upper rod 4, rotatably suspended from the fulcrum end of the graduated beam 2.

To the lower opening end of the said bulb 5, tightly fits a centrally bored closer member 7, preferably screwed, through which bore upwardly passes the upper portion of the lower rod 3, extending within the hollow space of the said bulb 5 and mounted by a flange 8, adapted to rest upon and registering with the upper surface of the closer member 7, the parts referred to being assembled therein previously to the assembling of the closer member 7.

An anti-friction means such for instance as balls 9, rollers, or any other equivalent, may be provided between two opposing surfaces of the said flange 8 and closer member 7, all as clearly illustrated.

It is obvious that by this arrangement, upon the rotation of the beam 2, and consequent turning of the bulb 5, and further in view of the anti-friction balls 9, permanently a smooth motion can be maintained between the two opposing surfaces of the flange 8 and closer member 7, while the lower rod 3 connected to the stationary part of the scale is kept normally in its position suspended.

The use of closed hollow bulb 5 produces results not heretofore attained with spin scales, and renders possible a permanent use of said scale, as the knife-edge of the fulcrum of the beam to which entire load is subjected is no way affected especially when the parts connecting rotatable and stationary parts is installed within the hollow space of the said bulb so as to prevent the access of grit and dust thereto, thereby facilitating the rotation of the parts as smoothly as desired.

Having thus described my invention, I claim as new and desire to secure by Letters Patent:—

A spin scale of the character described comprising in combination, a movable scale beam, a hollow standard and bi-partite connecting rod within said standard having its upper part rotatably suspended from the fulcrum of said scale beam and its lower part secured to the scale, a bulb between both parts of said rod, a hook for securing the upper end of said bulb to the upper part of said rod, a closing member fitting into the lower end of said bulb, a flange secured to the upper end of the lower part of the connecting rod passing through said closer member and extending into the hollow space of said bulb, balls between the lower surface of said flange and upper face of said closing member.

In testimony whereof I affix my signature in presence of two witnesses.

TAHEI IUCHI.

Witnesses:
 W. EBIHARAH,
 I. SERVICI.

Copies of this patent may be obtained for five cents each, by addressing the "Commissioner of Patents, Washington, D. C."